United States Patent
Brickner et al.

(10) Patent No.: US 9,839,274 B1
(45) Date of Patent: Dec. 12, 2017

(54) CONSUMER GOOD MULTIMEDIA SYSTEM

(71) Applicants: Colleen Ann Brickner, Edinboro, PA (US); David Stephen Willoughby, Webster, NY (US)

(72) Inventors: Colleen Ann Brickner, Edinboro, PA (US); David Stephen Willoughby, Webster, NY (US)

( * ) Notice: Subject to any disclaimer, the term of this patent is extended or adjusted under 35 U.S.C. 154(b) by 19 days.

(21) Appl. No.: 15/180,040

(22) Filed: Jun. 12, 2016

(51) Int. Cl.
| | |
|---|---|
| *A45D 20/12* | (2006.01) |
| *H04B 1/3827* | (2015.01) |
| *H04R 1/02* | (2006.01) |
| *H04R 1/08* | (2006.01) |
| *G06F 3/16* | (2006.01) |
| *H04R 3/00* | (2006.01) |
| *H04R 5/02* | (2006.01) |
| *H02J 7/35* | (2006.01) |
| *H02J 7/00* | (2006.01) |

(52) U.S. Cl.
CPC .............. *A45D 20/12* (2013.01); *G06F 3/165* (2013.01); *H02J 7/0052* (2013.01); *H02J 7/35* (2013.01); *H04B 1/3833* (2013.01); *H04R 1/028* (2013.01); *H04R 1/08* (2013.01); *H04R 3/00* (2013.01); *H04R 5/02* (2013.01); *H04R 2420/07* (2013.01)

(58) Field of Classification Search
CPC . A45D 20/12; G06F 3/165; H02J 7/35; H04B 1/3833; H04R 1/028; H04R 1/08; H04R 3/00; H04R 5/02; H04R 2420/07
USPC ....................................................... 34/90, 97
See application file for complete search history.

(56) References Cited

U.S. PATENT DOCUMENTS

| | | | | |
|---|---|---|---|---|
| 2,541,980 A | * | 2/1951 | Antone ................. | H04R 1/021 381/388 |
| 2,966,550 A | | 12/1960 | Goldberg et al. | |
| 4,020,284 A | * | 4/1977 | Phillips .................... | H04R 1/32 381/2 |
| 4,641,014 A | * | 2/1987 | Bland ..................... | A45D 20/10 132/212 |
| 5,531,032 A | | 7/1996 | Wooderson et al. | |
| 7,278,734 B2 | * | 10/2007 | Jannard ................. | G02C 3/003 351/158 |
| 7,946,056 B2 | * | 5/2011 | Kroll ....................... | A45D 20/22 132/233 |
| 8,174,232 B2 | * | 5/2012 | Jee .......................... | H02J 7/025 320/101 |
| 8,763,750 B1 | | 7/2014 | Berkman et al. | |
| 9,036,847 B2 | * | 5/2015 | Han ....................... | H04R 1/105 348/55 |

(Continued)

FOREIGN PATENT DOCUMENTS

| | | | | |
|---|---|---|---|---|
| JP | 54098482 A | * | 8/1979 | ............. B60R 99/00 |
| JP | 3395825 B2 | * | 4/2003 | |
| KR | 20060125418 A | * | 12/2006 | |

OTHER PUBLICATIONS

Stereo from one Speaker? Paradigm say Yes! from news.softpedia.com dated Apr. 2007.*

*Primary Examiner* — Stephen M Gravini
(74) *Attorney, Agent, or Firm* — David Willoughby

(57) ABSTRACT

What is presented is a multimedia system for incorporation with a consumer good. The system comprises one or more stereo speakers; a memory for the storage of one or more data files; a power supply coupled to power the one or more stereo speakers; and a switch coupled to temporarily cutoff power from said power supply to said one or more stereo speakers.

20 Claims, 8 Drawing Sheets

(56) References Cited

U.S. PATENT DOCUMENTS

| | | | |
|---|---|---|---|
| 2003/0068057 A1* | 4/2003 | Miller | H04B 1/385 381/334 |
| 2009/0099836 A1* | 4/2009 | Jacobsen | G06F 17/289 704/3 |
| 2014/0022941 A1 | 1/2014 | Apte et al. | |

* cited by examiner

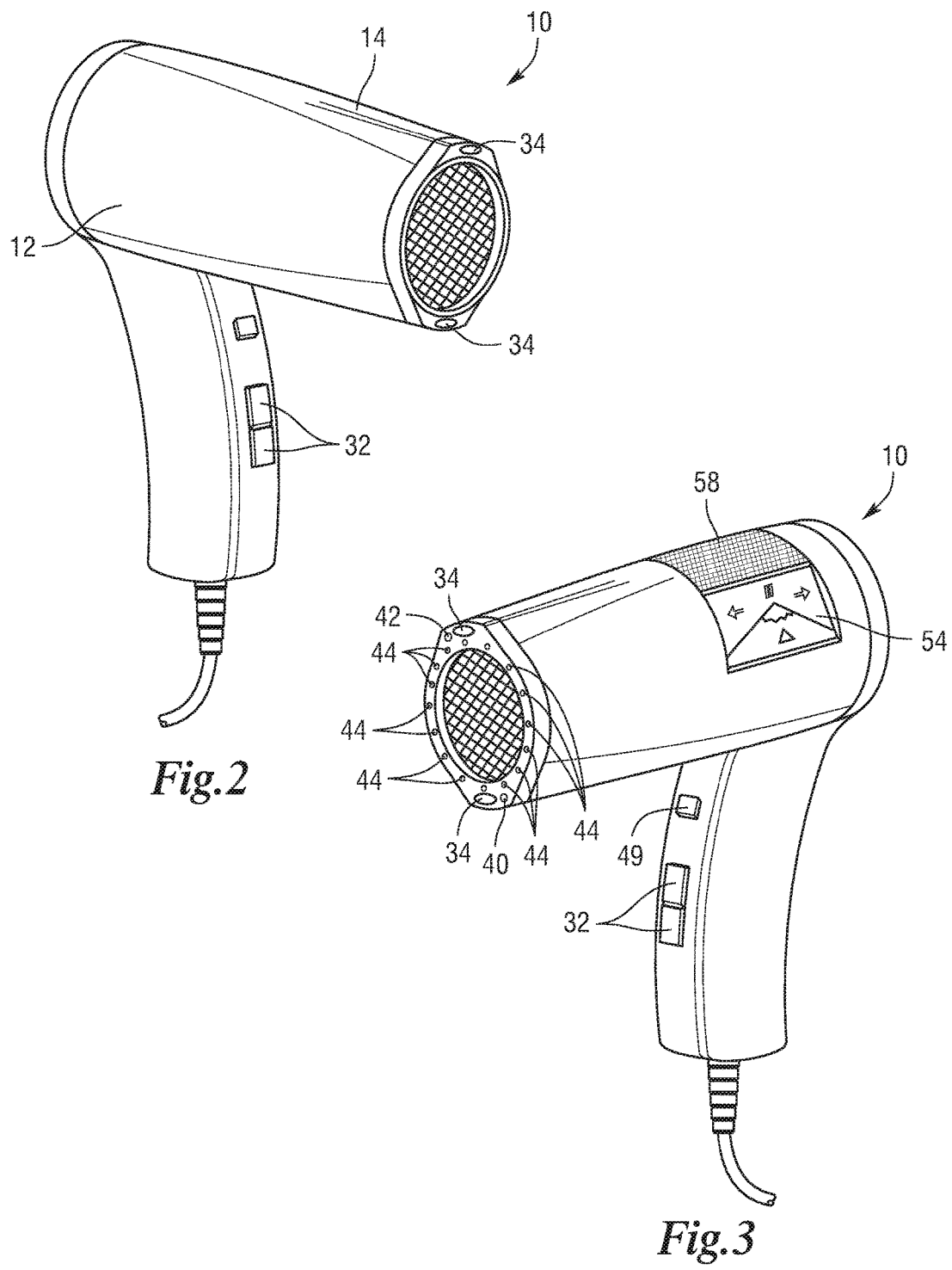

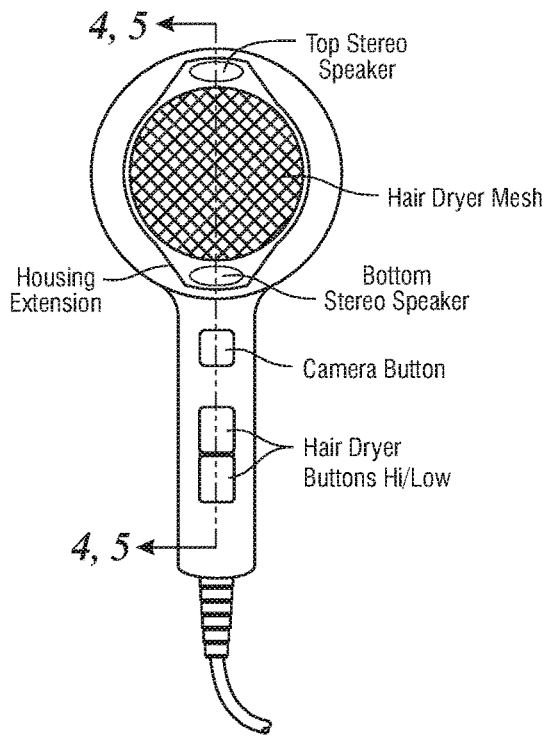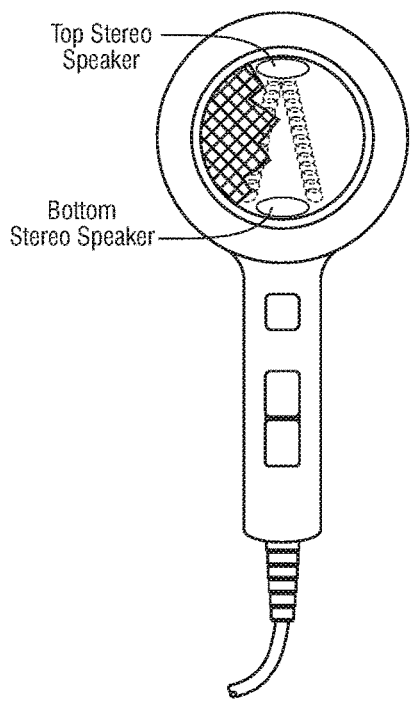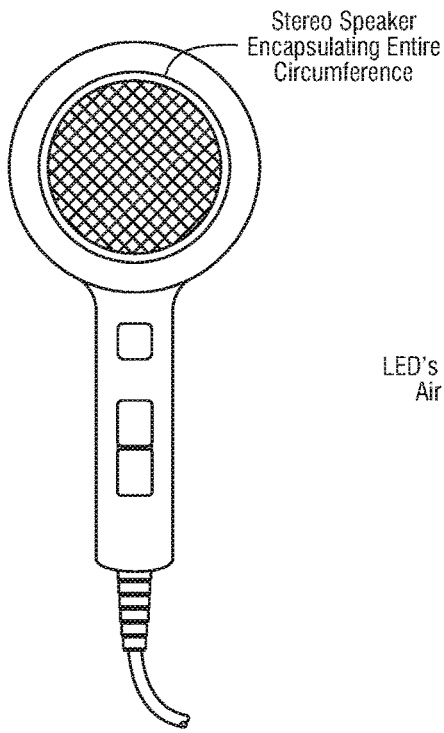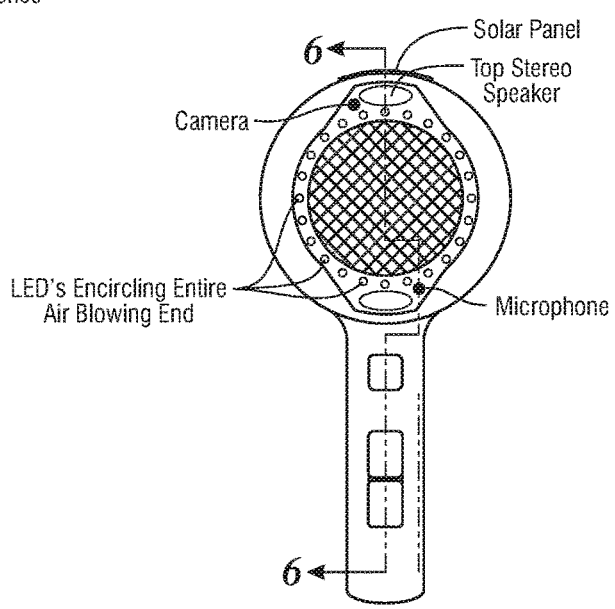
Fig. 7
Fig. 8
Fig. 9
Fig. 10

CONSUMER GOOD MULTIMEDIA SYSTEM

BACKGROUND OF THE INVENTION

Consumer goods are tangible goods that are purchased for direct consumption to satisfy a human need or want (i.e., purchased for direct consumption). For the most part, consumer goods are designed to make household life more convenient. For instance, vacuum cleaners make it easier for people to clean embedded dirt and dust from carpets, upholstery, and drapery. Sewing machines allow people to fix and create their clothing by stitching fabric together. Hand-held, hair dryers moreover allow people to accelerate the drying of their hair after wetting it.

While consumer goods make certain aspects of life easier, their use can in turn be an inconvenient and monotonous chore. For instance, hand-held consumer goods tend be relatively heavy, bulky, and their operation requires a certain level of skill, all of which ends up restricting the user's focus to completing the task at hand. Users can often feel drained of energy, which often causes the user to putting off the use, or complete avoidance, of their consumer goods. In particular, one generally sacrifices operating their stereo system or smart phone while drying their hair with a hair dryer. As such, one may end up spending less time drying their hair than would be required for effectiveness or choosing to go out into public with wet, unkempt hair.

What is therefore needed is a system that may be installed into consumer goods so as to allow a user to simultaneously operate the consumer good and other devices to make use of the consumer good unexpectedly pleasant, synergistically effective, and adds to the good's convenience (i.e., consumer good telematics). The present invention fulfills these needs by transforming consumer goods into network nodes far multimedia purposes (i.e., as part of "the internet of things") as well as other needs which will become apparent herein.

SUMMARY OF THE INVENTION

The present invention is a multimedia system for incorporation with a consumer good. The system comprises one or more stereo speakers; a memory for the storage of one or more data files; a power supply coupled to power the one or more stereo speakers; and a switch coupled to temporarily cutoff power from the power supply to the one or more stereo speakers.

In certain embodiments, the system further comprises a microphone for hands free communication. The system may also further comprise a digital camera configured to encode digital images and digital videos. The system may further comprise one or more light emitting diodes to project light from at least a portion of the consumer good. The system may even further yet comprise a mobile computing device comprising a consumer-product-media-system module, the mobile computing device may be wirelessly coupled to one or more stereo speakers, wherein the one or more audio files is controlled by the consumer-product-media-system module through the remote mobile computing device so as to be played through the one or more stereo speakers. The system may even further yet comprise a low-power transceiver coupled to the stereo speakers, the transceiver may be configured to wirelessly transmit data information; and a mobile computing device comprising a consumer-product-media-system module, the mobile computing device in wireless transmission with the transceiver; and wherein the memory is located within the mobile computing device, wherein the consumer-product-media-system module is configured to wirelessly transmit the one or more audio files through the remote mobile computing device and to the transceiver so as to be played through one or more stereo speakers.

The switch may be a capacitive touch panel coupled to both the one or more stereo speakers and the memory, wherein the touch panel has visual capabilities and allows a user to control the one or more data files. The power supply may be a power cord configured to connect to a remote power outlet. The power supply may be a rechargeable battery. In certain instances, the system may also comprise a solar panel coupled to the rechargeable battery, for recharging the battery when the solar panel is at least partially exposed to a light source. The consumer good may be a hand-held blow dryer comprising: a casing having a handle and a barrel; a motor-powered fan operatively positioned within the casing, the fan configured to generate an airflow through the barrel; and one or more heating elements operatively positioned to heat the airflow; and wherein one or more stereo speakers is mounted at the periphery of the barrel such that the airflow passes one or more stereo speakers in a substantially uninterrupted manner.

In another embodiment the invention may be a hand-held blow dryer incorporating multi-media functionality. The blow dryer comprises: a casing having a handle, a barrel, and a volute; a motor operatively positioned within the volute, the motor comprising a fan configured to generate an airflow which passes through the barrel; one or more heating elements operatively positioned to heat the airflow; one or more stereo speakers mounted at the periphery of the barrel end such that the airflow passes one or more stereo speakers in a substantially uninterrupted manner; a low-power transceiver coupled to one or more stereo speakers, the transceiver configured to wirelessly transmit data information with a mobile computing device; a plurality of light emitting diodes to project light from at least a portion of the periphery of the barrel end; a power supply coupled to power the motor, one or more stereo speakers, the transceiver, and the light emitting diodes; and a switch coupled to temporarily cutoff power from the power supply.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

FIG. 2 is a perspective view of an embodiment of the present invention, as installed in an embodiment of a hair dryer;

FIG. 3 is a perspective view of another embodiment of the present invention, as installed in the hair dryer of FIG. 2;

FIG. 7 is a forward-facing view of the embodiment of the present invention as shown in FIG. 2;

FIG. 8 is a forward-facing view of another embodiment of the present invention;

FIG. 9 is a forward-facing view of another embodiment of the present invention;

FIG. 10 is a forward-facing view of the embodiment of the present invention as shown in FIG. 3;

DETAILED DESCRIPTION OF THE PREFERRED EMBODIMENTS

Consumer goods are characteristically considered products purchased for consumption by an average consumer (i.e., being purchased for personal use). Such goods may alternatively be called "final goods" or "convenience goods"; consumer goods are the end result of production and manufacturing and are what is seen on the store shelf. Alternatively, commodities such as copper are not considered consumer goods because they have yet to be transformed into a usable product. As such, examples of consumer goods may include appliances such as, but not limited to, hand-held hair dryers, vacuum cleaners, microwave ovens, and refrigerators. Consumer good examples may further include fixtures such as, but not limited to, shower heads, chandeliers, and lighting systems.

Figure 1:
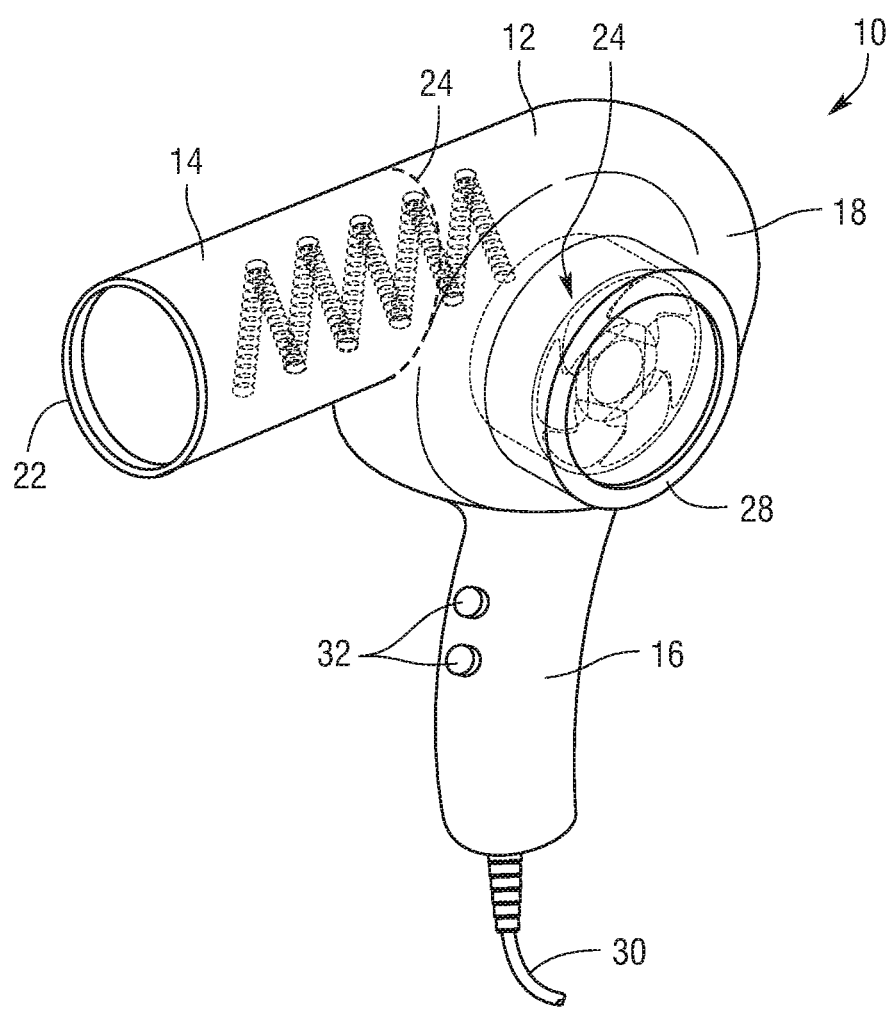
FIG. 1 is a side view of a typical prior art hair dryer.

Referring to the drawings in detail, and specifically to FIG. 1, one example of a typical conventional consumer good is a hand-held hair dryer which is generally indicated by reference numeral 10. Hair dryer 10 includes casing 12 with a laterally extending, hollow, tubular-shaped barrel 14, a longitudinally extending handle portion 16, and a hollow volute 18 that connects both the barrel 14 and handle 16. Casing 12 may moreover be defined by two unitary subparts and removably joined (as by screws). A heating element 20 is located between the outlet-end 22 and inlet-end 24 of barrel 14. An electric motor 26 comprising rotatable fan blades (e.g., impeller) is located within volute 18 and adapted to draw ambient air through an air-intake port 28 so as to propel such air into the inlet-end 24 of barrel 14.

Conventionally, heating element 20 is constructed of the high-resistance electrical conductor type which helically surrounds the central axis of barrel 14, between ends 22 and 24. Electrical power to heating element 20 and motor 26 is suppliable through an electrical power cord 30 (power supply), which is adapted to connect with a remote power outlet (not shown). Power cord 30 moreover extends into hair dryer 10 through handle 16 and can be interruptible by an electrical switch 32 positioned on the external side of handle 16. Thus, when electrical power is supplied to the heating element 20 and the motor fan blades 26 are made to continuously rotate, ambient air is drawn through air-intake port 28 and is impelled to heating element 20 and emerges out the distal end of barrel 14 as a heated airflow suitable for drying the hair of a user maintaining directional control of the airflow with the handle 16. In certain instances, hair dryer 10 may incorporates an ion emitter device (not shown) to allow hair dryer 10 to work by the corona effect. It should be appreciated that hair dryer 10 may also be of the ceramic and tourmaline variety.

Figure 4:
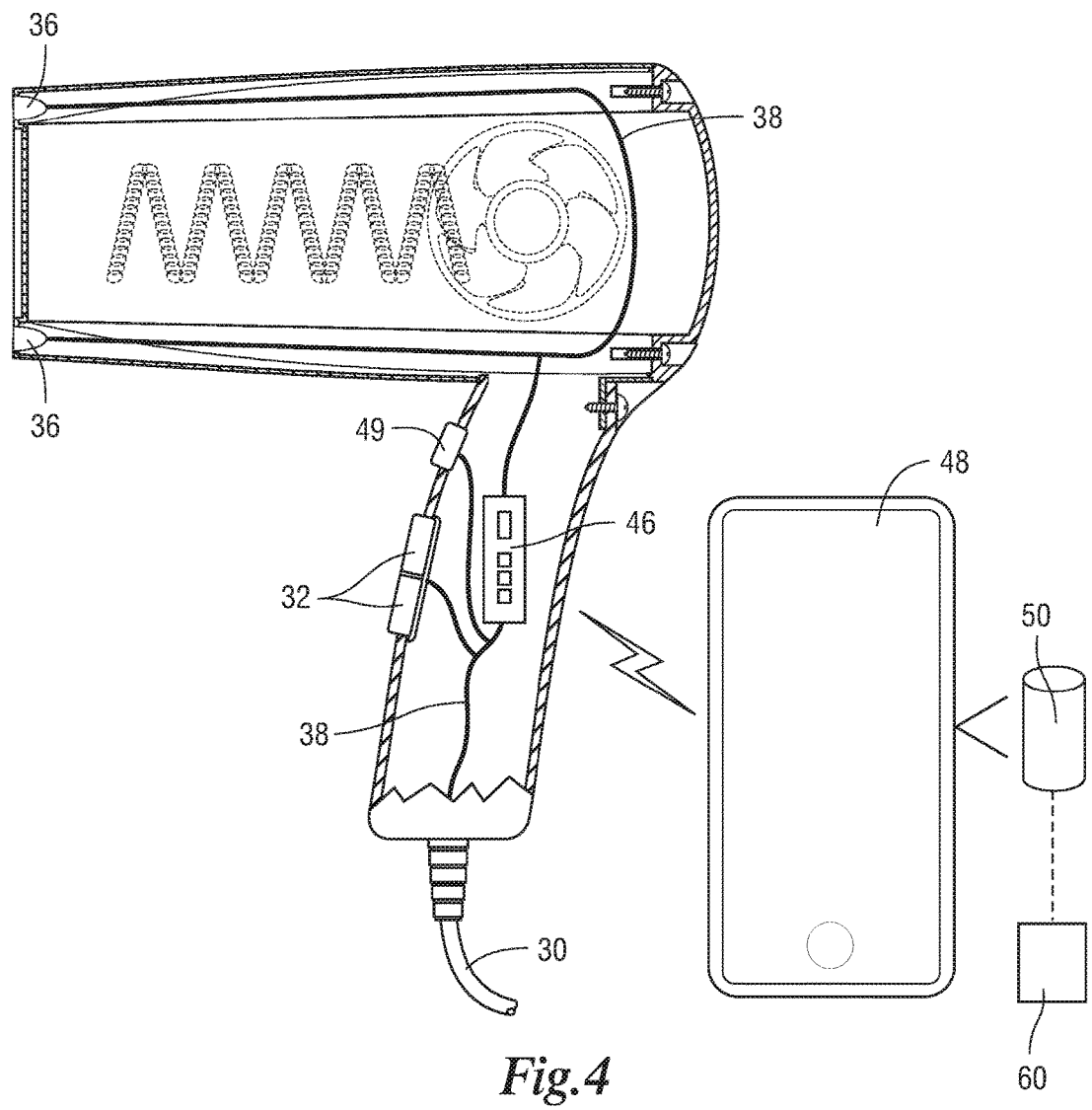
FIG. 4 is a cut-away side view of an embodiment of the present invention as taken along the line 4,5-4,5.

FIG. 2 is representative of hair dryer 10 having installed a multimedia system that includes number of functional components, each of which being in communication with other components within the system via wire coupling or wireless signal transmissions. As shown, one these system components is a pair of micro-sized loudspeakers 34 embedded into casing 12, at the distal end periphery of barrel 14, to generate stereo sound. Casing 12 may thus include sockets 36 (FIG. 4) suitable for the installation of these loudspeakers. Such an implantation allows loudspeakers 34 to be remote from the hottest portions of barrel 14. Baffles may also be installed in barrel 14 to direct the airflow away from loudspeakers 34. The internal facing end of each socket 36 is open to allow its respective speaker 34 to be electrically coupled to power cord 30 via a respective wire of an internal wiring network 38 (FIG. 4). Situating loudspeakers 34 in this manner allows the airflow to pass out of the distal end of barrel 14 in a substantially uninterrupted manner.

Each loudspeaker 34, in particular, has a compact size, light weight and uses low amounts of power (with impedances typically ranging in between 4 Ohms-16 Ohms). The loudspeakers 34 should moreover be of a full range with a wide and balanced frequency response and very good low range reproduction, suitable for music and speech reproduction. The loudspeaker may also include a neodymium driver, paper cone or plastic diaphragm, and/or plastic basket. In certain instances, loudspeakers 34 are parametric speakers designed to focus the generated sound at a high intensity into a relatively small area.

As shown in FIG. 3, positioned next to the loudspeaker 34, installed on the lower half of barrel 14 may be a bulk-in, front facing microphone 40 that allows for hands free communication when hair dryer 10 is operatively paired with a suitable computing device (discussed below). Similar to loudspeakers 34, discussed above, this implantation allows microphone 40 to be remote from the hottest portions of barrel 14. It should be appreciated that microphone 40 may be of the super-cardioid or hypercardioid polar pattern variety so as to ensure any noise from the generated airflow does not substantially effect the communications from the user of hairdryer 10. Microphone 40 may further be configured to eliminate a proximity effect.

Positioned next to the loudspeaker 34, installed on the upper half of barrel 14, may be a digital camera 42 configured to encode digital images and digital videos when hair dryer 10 is operatively paired with a suitable computing device (discussed below). Similar to loudspeakers 34, discussed above, this implantation allows camera 42 to be remote from the hottest portions of barrel 14. It should be appreciated camera 42 may capture 8-megapixels of a 1.5 μm pixel size. Camera 42 may also include a five-element lens having a sapphire crystal lens cover, high-wattage, light emitting diode (LED) variety flash.

A series of LEDs 44 may also be embedded into casing 12, at the distal end periphery of barrel 14. As can be seen, each of the LEDs 44 is positioned to encircle the circumference of the barrel, opening in such a manner which avoids interference with loudspeakers 34 and microphone 40. The LEDs 44 are typically embedded into casing via sockets that only allow for an end portion of the LEDs 44 to be exposed to the surrounding environment. The LEDs 44 are thus configured to project light outwardly and directly in front of the distal end of barrel 14. This therefore allows a user to have better visibility of the surface in which barrel 14 is directing the airflow. It should be appreciated that positioning the LEDs 44 in this manner (as well as the loudspeakers, camera, and microphone) allows for a diffuser or concentrator (not shown) to be releasably attached to barrel 14 with ease.

The series of LEDs 44 may also be configured to switch on and off to generate random, aesthetic patterns. In certain instances, hair dryer 10 may incorporate an integrated circuit chip (not shown) configured to process the stereo sound emanating from loudspeakers 34, through microphone 40, and in turn cause LEDs 44 to switch on and off in such a manner that generates an overall visual display to conceptually mimic the corresponding sound pattern (i.e., patterns moving with the beat of music). In other instances, software code (e.g., a pre-programmed algorithm) may be incorporated into a consumer-product-media-system module (discussed below) to similarly allow LEDs 44 to switch on and off in a variety of pre-configured aesthetic patterns. It should be appreciated that the series of LEDs 44 may be of a uniform color (e.g., white) or may be of multiple colors (e.g., blue, red, green, etc.).

As shown in FIG. 4, an internally housed, low-power transceiver 46 is positioned within handle 16. Transceiver 46 is coupled to and communicates with loudspeakers 34, microphone 40, camera 42, and LEDs 44 via wiring network 38. In a similar manner, transceiver 46 is coupled to power cord 30 to receive electric power.

Transceiver 46 is generally comprised of Bluetooth (e.g., v3.0+A2DP) and allows the user to wirelessly transmit data information (i.e., stream data) with a corresponding transceiver device incorporated into a remotely located mobile computing device 48 (e.g., smart phone MP3 player, smart television, digital media console, etc.). As such, when mobile computing device 48 stores audio data files (e.g., MP3 files) within one or more of its internal memory storage devices 50 (e.g., hard drive), transceiver 46 allows the user to send (i.e., stream) their audio data file sounds (i.e., music, podcasts, television programs, etc.) to loudspeakers 34. Such functionality allows users with the ease of remotely sending commands between their connected computing device 48 and loudspeakers 34 and vice versa. Moreover, whereas before, users were forced to listen to the humdrum, white noise of the typical airflow, they now have the ability to enjoy listening to their own selected music, podcasts, audio books, television programs, or any other equivalent audio file. This functionality helps to generally ensure the task of hair drying does not feel as much like a chore for the user as well as transforms hair dryer 10 into an embodiment of a telematics device.

It should be appreciated when mobile computing device 48 is embodied as a television set having the capability to communicate with transceiver 46 (e.g., television, smart television, television connected with a digital media console), sounds from programs played through the television may be played directly or indirectly through loudspeakers 34. For example, the user may only be able to listen to their television program through loudspeakers 34 or the user (and other viewers) may be able to listen to the program though the television as well as loudspeakers 34. It should be understood that a digital media console, typically for use with a television, could be embodied as a data streaming device such as, but not limited to, Apple TV™ and Roku™ or the device could be embodied as a video game console such as, but not limited to, Xbox™, Nintendo Wii™, or Sony Playstation™. A skilled artisan will see that a television and/or digital media console may comprise their own independent internal/external memory storage device 50 or may act as a node which relays (i.e., streams) at least a portion of data from a remote memory storage device 50 located, for example, in an internet cloud.

Incorporation of microphone 40 further allows the user to send voice commands to mobile computing device 48. For instance, when a voice recognition software module (e.g., SIRI™) is configured to be compatible with the consumer-product-media-system module 60, the user may voice command mobile computing device 48 to switch to a new audio file. In other instances, when mobile computing device 48 is embodied as a smart phone, simultaneous use of loudspeakers 34 and microphone 40 transforms hair dryer 10 into an extension of the device's telephonic functionality.

Incorporation of camera 24 further yet allows the user to send digital images to mobile computing device 48. As such, hair dryer 10 may incorporate a button/trigger 49 which acts to command dryer 10 to capture each digital image. For instance, the user may press the trigger while drying hair to capture an image of their facial profile. In other instances, when mobile computing device 48 is embodied as a smart phone, simultaneous use of loudspeakers 34, microphone 40, and camera 24 enables hair dryer 10 to communicate with certain video chat modules such as, for example, SKYPE™ or FACETIME™, via mobile computing device 48.

A memory device 50 may also be internally housed within handle 16 or the memory may be embedded in transceiver 46. Memory 50 enables hair dryer 10 to, at least temporarily, store data files (e.g., audio or image) before or after being transmitted via transceiver 46. It is also envisioned that memory 50 may include enough storage capacity to store and access a number of data files without requiring transmission with mobile computing device 48. As such, a user may command retrieval of each data file via microphone 40.

Figure 5:
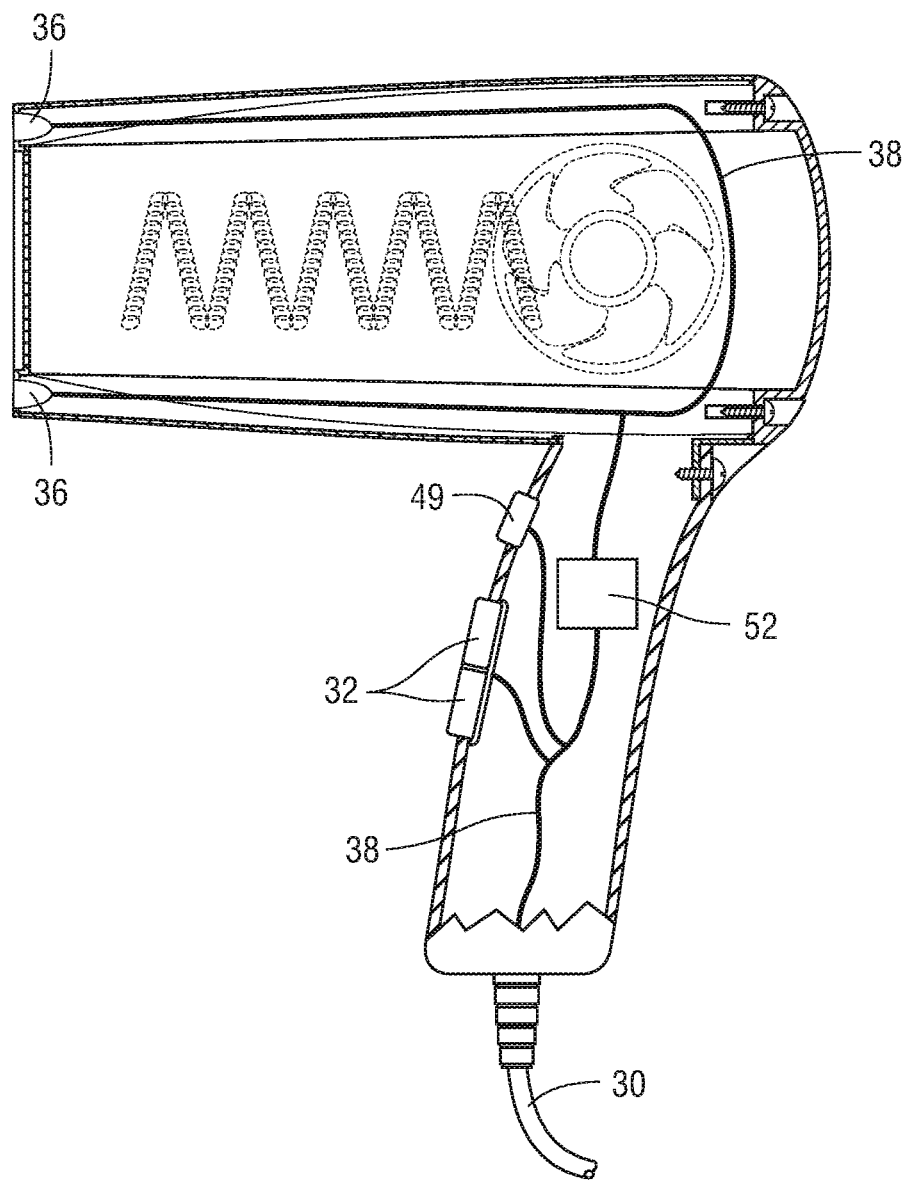
FIG. 5 is a cut-away side view of another embodiment of the present invention as taken along the fine 4,5-4,5.

As shown in FIG. 5, a universal serial bus (USB) port 52 may be positioned in handle 16 and may protrude through a portion of casing 12. Port 52 enables mobile computing device 48 to be coupled to and communicate with hair dryer 10 via a USB cord. Furthermore, when embodiments of hair dryer 10 incorporates an internal memory device 50, the user may upload their data files to memory 50 from mobile computing device 48 via the USB cord prior to accessing the files during use of hair dryer 10. It should be appreciated that port 52 may also be embodied as a micro USB 2.0 port, USB On-the-Go Port (e.g., 1.2), 3.5 mm gold plated AV connector, and/or as SIM card dock.

Referring back to FIG. 3, a capacitive touch panel 54 (touchscreen) may be mounted to casing 12. Within hair dryer 10, touch panel 54 may be coupled to both stereo speakers and the transceiver 46. Touch panel 54 is operated through known tactile control methods and has visual capabilities that allow the user to control one or more data files in the mobile computing device via the transceiver, internal memory, or a media device releasably connected to USB port. In certain instances, the user can use touch panel 54 to react to what is displayed and to control how it is displayed; for example, zooming to increase the text size. In particular, touch panel 54 typically consists of an insulator component, such as glass, coated with a transparent conductor component, such as indium tin oxide (InSnO). As the user is also an electrical conductor, touching the surface of the screen results in a distortion of the screen's electrostatic field, measurable as a change in capacitance.

Figure 6:
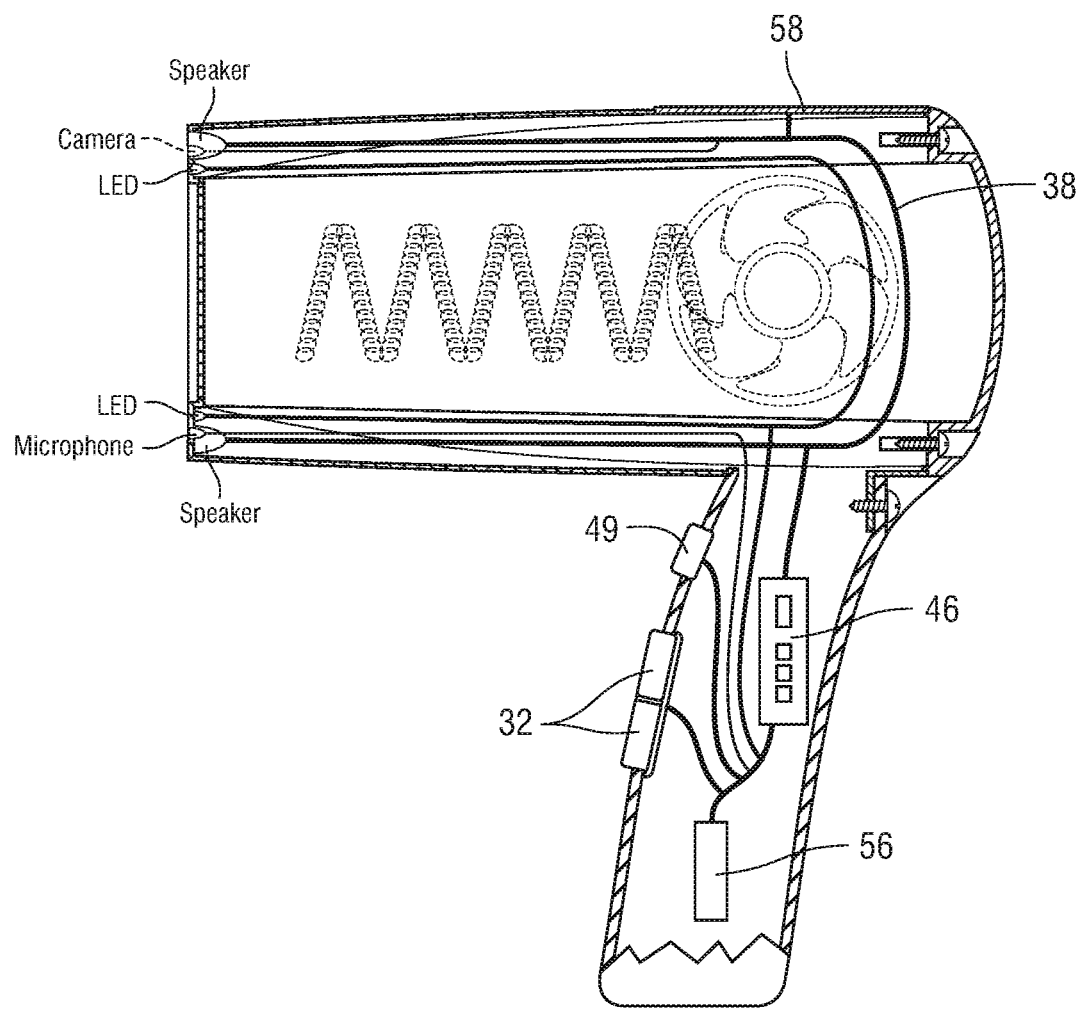
FIG. 6 is a cut-away side view of another embodiment of the present invention as taken along the line 6-6.

With reference to both FIGS. 3 and 6, the system may comprise a power supply that is a rechargeable battery pack 56. Battery pack 56 may be embodied as a light weight lithium ion battery based on compositions such as, but not limited to, lithium cobalt oxide, lithium iron phosphate, lithium ion manganese oxide, lithium nickel manganese cobalt oxide, lithium nickel cobalt aluminum oxide, lithium titanate, and lithium sulphur. In certain instances, a solar panel 58 may also be coupled to both battery pack 56 and casing 12, to allow for recharging of battery pack 56, when solar panel 56 is at least partially exposed to a light source such as the sun.

As shown in FIG. 7, a forward-facing display of hair dryer 10 shows each speaker 34 is situated closely to a screen covering outlet-end 22 of barrel 14. As shown in FIG. 8, a forward-facing display of hair dryer 10 shows another embodiment of the multimedia system in which each speaker 34 is situated within barrel 14, near the outlet-end 22 and covered by the screen. As shown in FIG. 9, a forward-facing display of hair dryer 10 shows another embodiment of the multimedia system in which speaker 34 has a circular shape that surrounds outlet-end 22 of barrel 14. In this embodiment speaker 34 could comprise a series of cones configured to surround outlet-end 22. As shown in FIG. 10, a forward-facing display of hair dryer 10 shows another embodiment of the multimedia system in which each speaker 34, a series of LEDs 44, microphone 40, and camera 42 are each situated closely to the screen covering outlet-end 22 of barrel 14.

Referring back to FIG. 4, as mentioned above, the consumer-product-media-system module 60 may be incorporated into the memory storage devices 50 of remotely located mobile computing device 48. Each of the stored audio files may be controlled by mobile computing device 48 through module 60, so as to be played through speakers 34. It should also be appreciated that each of the audio files may also be remotely controlled by hair dryer 10 through the remote mobile computing device (i.e., via microphone 40).

Module 60 may also be configured to act as a node which connects a remote television set (not shown) directly to transceiver 46. Such functionality would allow the user to watch a program on the television set while also being able to listen to the program through speakers 36.

Figure 11:
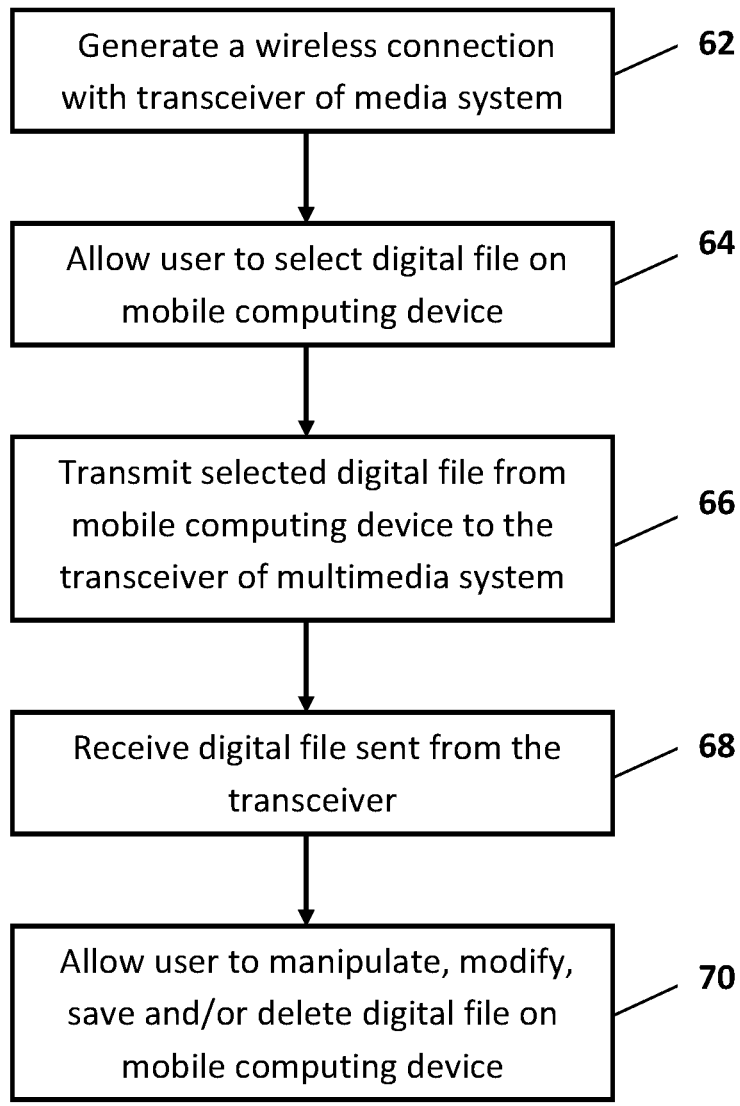
FIG. 11 is a algorithmic flowchart illustrating an example of the consumer-product-media-system module of the present invention.

Referring now to FIG. 11, exemplary steps for an algorithmic method, depicting the consumer-product-media-system module 60, can be seen. In step 62, the module generates and ensures a wireless connection is created between the mobile computing device (via a communication device) and transceiver 46. As discussed above, this connection is generally embodied as a Bluetooth wireless connection. In step 64, the module allows a user to select an audio file stored within memory 60 of the mobile computing device. This may be conducted through a user-interface-selection device of the mobile computing device. In step 66, the module transmits the selected audio file to transceiver 46, such that the audio file may be played through speakers 36. In step 68, the module may receive a digital image file from transceiver 46. The picture file may be generated through camera 42, as discussed above. In step 70, the user may manipulate, modify, save, and/or delete the picture file, sent from transceiver 46, on mobile computing device 48. File manipulation and modification, includes, but is not limited to, cropping, filtering, and adjusting the size and/or orientation of a picture. File saving is understood to be the temporary storage of the data file in the memory 50.

While an exemplary algorithmic method has been described above and with reference to FIG. 11, it will be understood that certain exemplary embodiments may change the order of steps of the method or may even eliminate or modify certain steps. Furthermore, each of the steps in the method described above and with reference to FIG. 11 may be embodied as computer software stored in the computer-readable storage medium for execution by a computing device (e.g., mobile device 108).

Having described the exemplary system and exemplary algorithms of the present invention, an exemplary computer environment for implementing the described mobile computing device and its execution is presented next.

Figure 12:
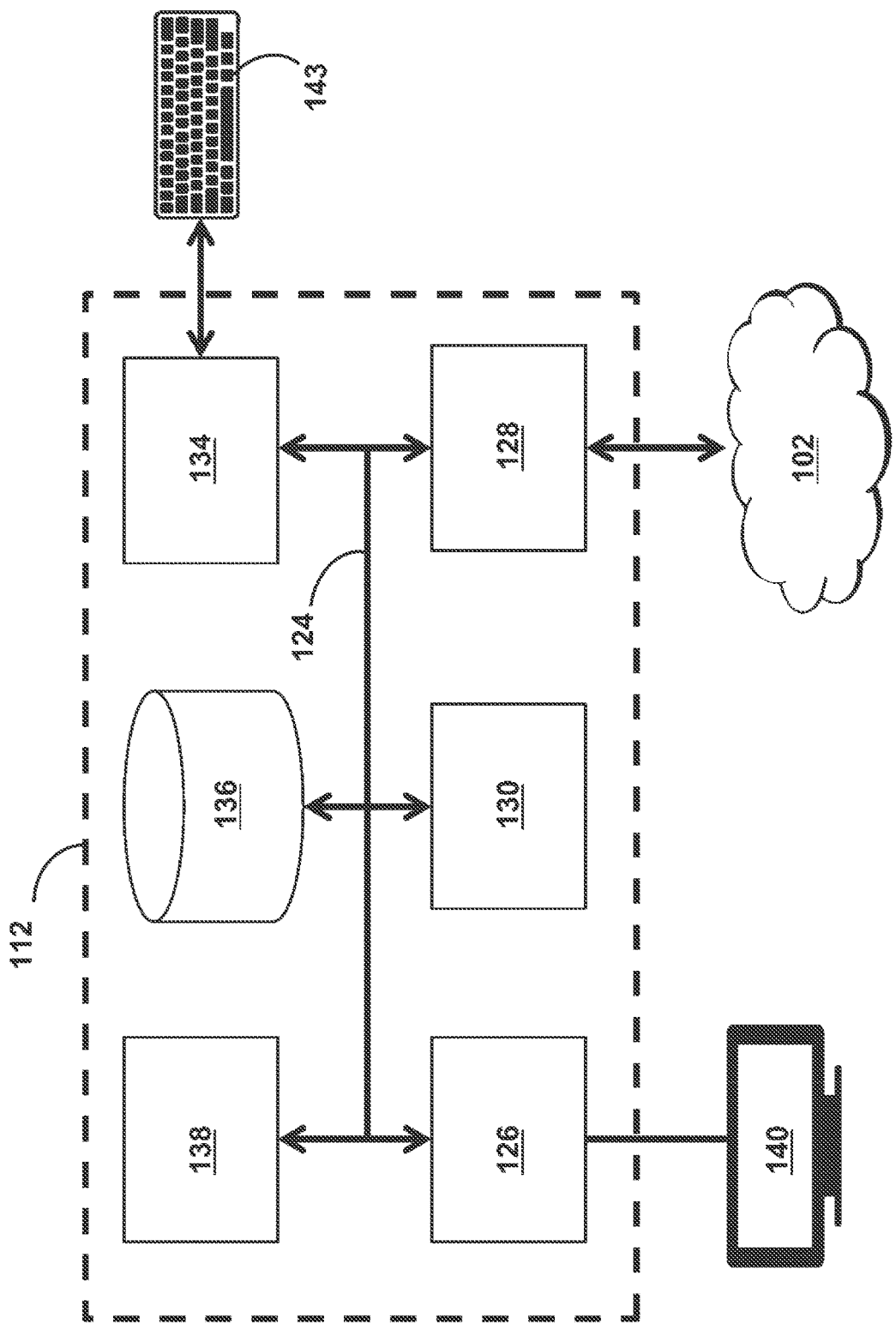
FIG. 12 generally illustrates a block diagram generally illustrating a computing environment in which at least a portion of the invention may be implemented.

FIG. 12 shows the components of an exemplary computing device 112 that may be used to implement any of the processing thus far described. Computing device 112 may include one or more embodiments (i.e., all embodiments of mobile computing device 48 discussed above) comprising a system bus 121 which couples each of a video interface 126, network interface 128, a user-input interlace 134, computer-readable storage medium (shown as a system memory 136), and Central Processing Unit (CPU) 138. A display 140 (shown as a monitor and stand) may be connected to video interface 126 and provides the user with graphical user interface (GUI) capabilities. As a result, display 140 allows the user to view commands and information which have been entered into computing device 112 via a user-interface-selection device 143 (shown as a keyboard). Selection device 143 may be permanently or releasably connected to user-input interface 134. Display 140 and selection device 143 may also be used in combination so as to form the GUI that allows the user to implement at least a portion of the present invention. In certain embodiments, display 140 and selection device 143 may be a single structure (e.g., touch screen).

Peripheral devices may be connected to the computing device 112 through universal serial bus (USB) port (not shown), to transfer information with computing device 112. Computing device 112 may also include USB port for reading from and writing to external memory devices (e.g., compact flash, memory stick/PRO and DUO, SD card, multimedia card, smart media xD card, portable hard drives, etc.).

System memory 136 is also connected to bus 124 and may comprise read only memory (ROM), random access memory (RAM), an operating system (e.g., Microsoft Windows/Apple OS), a basic input/output system (BIOS), application programs, and program data (e.g., PDB). In certain instances, computing device 112 may also include a battery (not shown) for the rechargeable storing of the electrical energy to power computing device 112 (e.g., lithium-ion battery). Computing device 112 may further include a Global Positioning System (GPS) device for communicating with a remote satellite system to provide certain coordinate information (e.g., location and time information) to the operating system and various application programs. Computing device 112 may further yet include an accelerometer for measuring the proper acceleration of computing device 112. It should be understood that computing device 112 may include other components not currently shown, such as, but not limited to, one or more biometric sensors, environmental and temperature sensors, magnetometers, microphones, proximity sensors, and luxmeters.

Computing device 112 may operate in a networked environment using logical connections with network 102. As discussed above, computing device includes a transmitter device 130 for exchanging data over short-distances (e.g., Bluetooth) with other computing devices (e.g., multimedia system). However, network interface 128 provides another communication path between bus 124 and network 102, which could also allow, for example, a data file to be communicated to the multimedia system when beyond the range of transmitter device 130. Network interface may be connected to an antenna (not shown) to create the communication path. But it will be appreciated that this network connection is merely exemplary, and it is within the scope of the present invention to use other types of network connections between computing device 112 and network 102, including both wired and wireless connections.

The constructions described above and illustrated in the drawings are presented by way of example only and are not intended to limit the concepts and principles of the present invention. As used herein, the terms "having", "comprising", and/or "including" and other terms of inclusion are terms indicative of inclusion rather than requirements. It should also be understood the system presented herein is not required to be in the configuration in which it is presented. It is further understood that when a feature is referred to as being "on", "connected to/with", or "coupled to/with" another feature, the feature can be directly on, connected to/with or coupled to/with the other feature or an intervening feature may be present.

While the multimedia system has been described with reference to preferred embodiments, it will be understood by those skilled in the art that various changes may be made and equivalents may be substituted for features, limitations, and/or components thereof to adapt to particular situations without departing from the scope of the inventive system. Therefore, it is intended that the system not be limited to the particular embodiments disclosed as the best mode contemplated for carrying out the multimedia system, but that the system will include all embodiments falling within the scope and spirit of the following claims.

What is claimed:

1. A multimedia system for incorporation with a hand-held blow dryer, said system comprising:
   a. at least two stereo speakers;
   b. a memory for a storage of one or more digital files;
   c. a power supply coupled to power the at least two stereo speakers;
   d. a switch coupled to temporarily cutoff power from said power supply to said at least two stereo speakers;
   e. wherein the hand-held blow dryer comprising:
      i. a casing having a handle and a barrel;
      ii. a motor-powered fan operatively positioned within said casing, said fan configured to generate an airflow through said barrel; and
      iii. one or more heating elements operatively positioned to heat the airflow; and
   f. wherein said at least two stereo speakers are mounted at the periphery of said barrel such that the airflow passes said at least two stereo speakers in a substantially uninterrupted manner.

2. The multimedia system of claim 1 further comprising a microphone for hands free communication.

3. The multimedia system of claim 1 further comprising a digital camera configured to encode digital images and digital videos.

4. The multimedia system of claim 1 further comprising one or more light emitting diodes to project light from at least a portion of the consumer good.

5. The multimedia system of claim 1 wherein said switch is a capacitive touch panel coupled to both said at least two stereo speakers and said memory, wherein said touch panel has visual capabilities and allows a user to control the one or more digital files.

6. The multimedia system of claim 1 further comprising a mobile computing device comprising a consumer-product-media-system module, said mobile computing device wirelessly coupled to said at least two stereo speakers, wherein the one or more audio files is controlled by said consumer-product-media-system module through said remote mobile computing device so as to be played through said at least two stereo speakers.

7. The multimedia system of claim 1 wherein:
   a. the system further comprising:
      i. a low-power transceiver coupled to said at least two stereo speakers, said transceiver configured to wirelessly transmit data information; and
      ii. a mobile computing device comprising a consumer-product-media-system module, said mobile computing device in wireless transmission with said transceiver; and
   b. wherein said memory is located within said mobile computing device, wherein said consumer-product-media-system module is configured to wirelessly transmit the one or more audio files through said remote mobile computing device and to said transceiver so as to be played through said at least two stereo speakers.

8. The multimedia system of claim 1 wherein said power supply is a power cord configured to connect to a remote power outlet.

9. The multimedia system of claim 1 wherein said power supply is a rechargeable battery.

10. The multimedia system of claim 1 wherein:
    a. said power supply is a rechargeable battery;
    b. the system further comprising a solar panel coupled to said rechargeable battery for recharging the battery when said solar panel is at least partially exposed to a light source.

11. A hand-held blow dryer comprising:
    a. at least two stereo speakers;
    b. a power supply coupled to power the one or more at least two stereo speakers;
    c. a switch coupled to temporarily cutoff power from said power supply to said at least two stereo speakers;
    d. a low-power transceiver coupled to said at least two stereo speakers, said transceiver configured to wirelessly transmit data information;
    e. a casing having a handle and a barrel;
    f. a motor operatively positioned within said casing, said motor comprising a fan configured to generate an airflow which passes through said barrel;
    g. one or more heating elements operatively positioned to heat the airflow; and
    h. wherein said at least two stereo speakers are mounted at the periphery of said barrel such that the airflow passes said at least two stereo speakers in a substantially uninterrupted manner.

12. The hand-held blow dryer of claim 11 further comprising a microphone for hands free communication.

13. The hand-held blow dryer of claim 11 further comprising a digital camera configured to encode digital images and digital videos.

14. The hand-held blow dryer of claim 11 further comprising a memory for the storage of one or more digital files.

15. The hand-held blow dryer of claim 11 further comprising one or more light emitting diodes to project light from at least a portion of the consumer good.

16. The hand-held blow dryer of claim 11 wherein said power supply is a power cord configured to connect to a remote power outlet.

17. The hand-held blow dryer of claim 11 wherein said power supply is a rechargeable battery.

18. A hand-held blow dryer incorporating multi-media functionality, the blow dryer comprising:
    i. a casing having a handle, a barrel, and a volute;
    ii. a motor operatively positioned within said volute, said motor comprising a fan configured to generate an airflow which passes through said barrel;
    iii. one or more heating elements operatively positioned to heat the airflow;
    iv. at least two stereo speakers mounted at the periphery of said barrel end such that the airflow passes said at least two stereo speakers in a substantially uninterrupted manner;

v. a low-power transceiver coupled to said at least two stereo speakers, said transceiver configured to wirelessly transmit data information with a mobile computing device;

vi. a plurality of light emitting diodes to project light from at least a portion of the periphery of said barrel end;

vii. a power supply coupled to power said motor, said at least two stereo speakers, said transceiver, and said light emitting diodes; and viii. a switch coupled to temporarily cutoff power from said power supply.

19. The hand-held blow dryer of claim 18 further comprising a microphone for hands free communication.

20. The hand-held blow dryer of claim 18 further comprising a memory for the storage of one or more digital files.

* * * * *